(12) United States Patent
Campbell et al.

(10) Patent No.: US 6,582,160 B2
(45) Date of Patent: Jun. 24, 2003

(54) HOPPER TEE AND INTEGRAL DISCHARGE VALVE

(76) Inventors: Eddie W. Campbell, 11231 N. Memorial Dr., Owasso, OK (US) 74055; Thomas J. Mueller, 15301 Deer Run La., St. Genevia, MO (US) 63670

( * ) Notice: Subject to any disclaimer, the term of this patent is extended or adjusted under 35 U.S.C. 154(b) by 21 days.

(21) Appl. No.: 09/876,448

(22) Filed: Jun. 7, 2001

(65) Prior Publication Data

US 2002/0187013 A1 Dec. 12, 2002

(51) Int. Cl.$^7$ ............................................... B65G 53/46

(52) U.S. Cl. ....................................... 406/131; 406/195

(58) Field of Search .................................. 406/131, 195

(56) References Cited

U.S. PATENT DOCUMENTS

| | | | |
|---|---|---|---|
| 1,860,346 A | 5/1932 | Anderson | |
| 2,228,857 A | 1/1941 | Stephenson | 236/45 |
| 3,251,122 A | 5/1966 | Boteler | 29/157.1 |
| 3,402,731 A | 9/1968 | Martin | 137/375 |
| 3,654,008 A | 4/1972 | Rogers et al. | 156/152 |
| 3,813,023 A | 5/1974 | Auray et al. | 228/19 |
| 4,652,020 A | 3/1987 | Gilroy | 285/47 |
| D297,678 S | 9/1988 | Sisk | D34/28 |
| 4,848,396 A | 7/1989 | Sisk | 137/375 |
| 5,387,015 A | 2/1995 | Sisk | 285/55 |
| 5,617,907 A | * 4/1997 | Sisk | 141/340 |
| 5,842,681 A | * 12/1998 | Sisk | 251/144 |

FOREIGN PATENT DOCUMENTS

GB          489602          1/1938

* cited by examiner

*Primary Examiner*—Joseph A. Dillon
(74) *Attorney, Agent, or Firm*—Haverstock, Garrett & Roberts LLP

(57) ABSTRACT

The hopper tee provides increased material flow rates and includes a first hollow pipe section having an upper end and an opposite lower end, the upper end including an inlet opening for connecting to a discharge opening of a hopper for receiving material contained in the hopper therethrough, and an interior cylindrical side wall forming an internal passage connecting the inlet opening to the lower end for flow of the material thereto. The hopper tee includes a second hollow pipe section having a first open end, an opposite second open end, an intermediate portion therebetween, and an interior cylindrical side wall forming an internal passage connecting the first and second open ends providing a flow path for a flow of air therethrough, the lower end of the first hollow pipe section being connected to the intermediate portion of the second hollow pipe section forming a material inlet port connecting the internal passage of the first hollow pipe section to the internal passage of the second hollow pipe section for flow of the material into the flow path. The hopper tee further includes an element or flow director disposed in the internal passage of the second hollow pipe section having a surface protruding from the cylindrical side wall thereof into the flow path and oriented at an acute angle with respect to a cylinder axis of the side wall, for directing a portion of the flow of air adjacent to the material inlet port away from the port at an increased velocity for inducing the flow of the material through the port into the flow path.

4 Claims, 5 Drawing Sheets

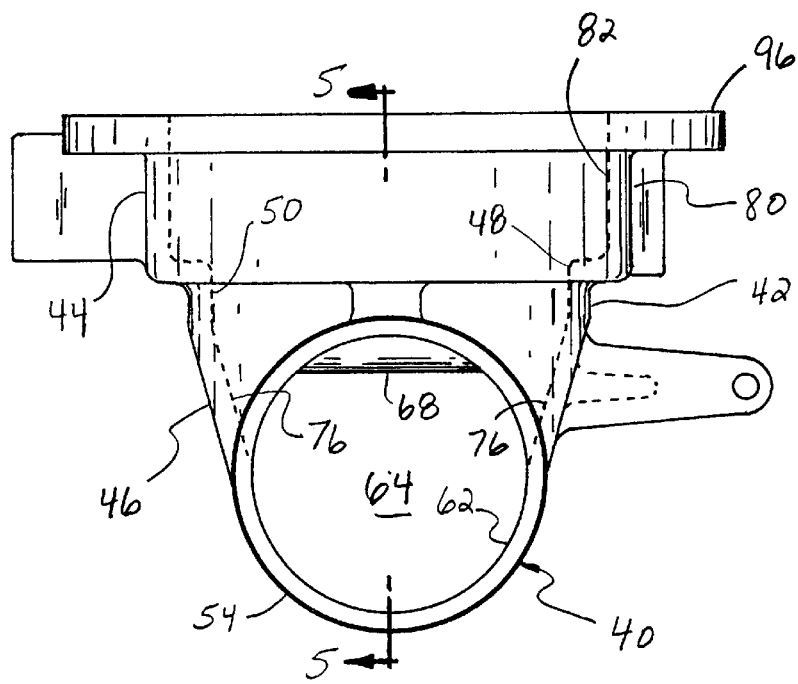
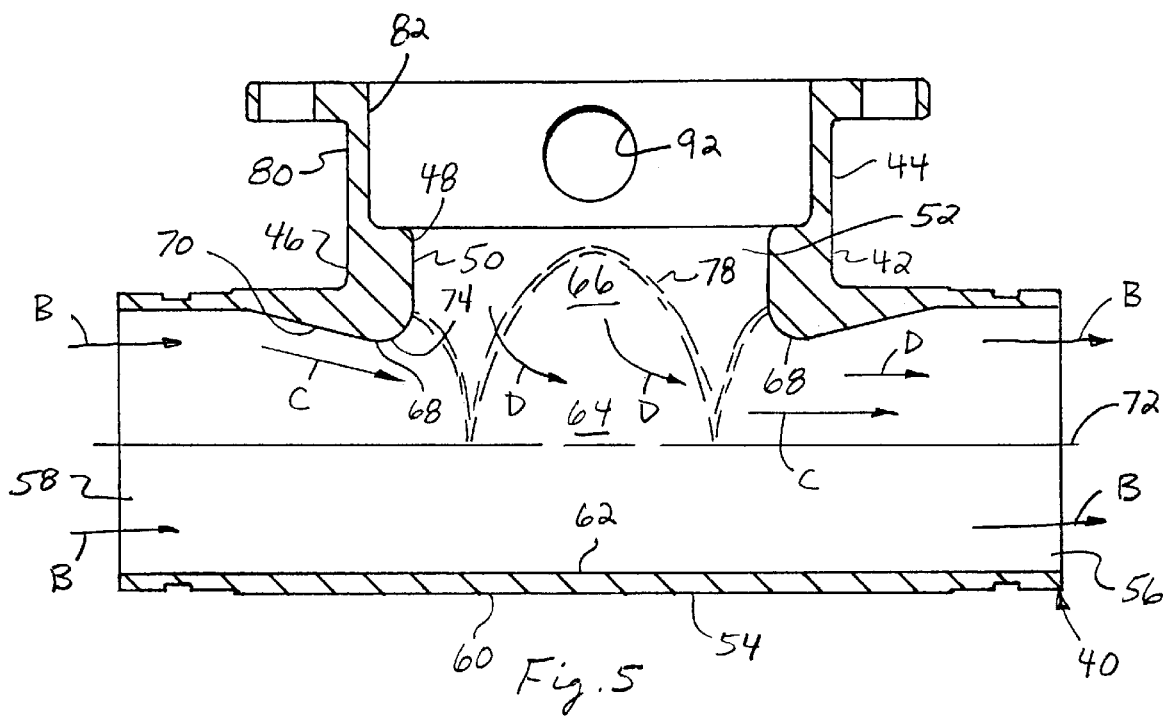

HOPPER TEE AND INTEGRAL DISCHARGE VALVE

TECHNICAL FIELD

The present invention generally relates to tees and discharge or dump valves for connection to the bottoms of hoppers for use in unloading the contents thereof, and more particularly, to a tee which provides improved material flow characteristics for faster and more clog-free unloading, and which can include a discharge or dump valve integral or incorporated therein so as to have a smaller overall height to provide improved ground clearance compared to prior known tee and discharge valve assemblies.

BACKGROUND ART

Commonly, mobile hopper trailers and vehicles are used for carrying bulk commodities such as industrial products such as pelletized plastics and the like, and food products such as milled flours and the like. Typically, the hoppers include multiple sections or compartments for receiving and holding the products, each section or compartment having a generally conical or tapered bottom portion terminating at a discharge outlet. A discharge or dump valve is typically connected to the outlet and to an inverted tee located beneath the valve, the tee being connected on both ends to generally horizontal pipes or hoses connected in turn to the tees of the other sections or compartments. In this manner, a generally horizontal path through the tees and connected pipes or hoses is formed for the flow of the materials discharged from the hopper sections or compartments. The discharge or dump valves can selectably be opened to allow the material to be discharged from the selected hopper therethrough, under force of gravity and/or a pressure differential between the hopper section and the flow path, vibration often being used to facilitate the material flow from the hopper and to prevent bridging wherein the material forms a self-supporting arch or dome above the discharge outlet. A pneumatic flow is typically generated through the flow path by a blower or the like disposed at one end of the flow path, to carry the discharged material through the flow path to a receiver or connection at another end of the path.

For productive unloading, it is desired that the material discharge from the hopper sections or compartments be as rapid and smooth as possible. For a long time, tees have been fabricated from pipe sections welded together. It is also known to cast tees. Reference in this latter regard, Sisk U.S. Pat. No. 4,848,396, issued Jul. 18, 1989, which discloses a cast hopper tee that utilizes smooth and uninterrupted internal surfaces in the area of juncture of vertical and horizontal pipe sections thereof to provide the recited advantages of complete and continuous flow of product from the vertical pipe section and subsequent flow without impedance into the horizontal pipe section. However, this approach, although possibly providing good material flow characteristics into the horizontal pipe section, discloses only usage of unobstructed, straight through flow in the horizontal pipe section, which has been found by the present inventors to not be of particular advantage to increasing material flow rate, and consequently, other means for increasing productivity are sought.

Another area where improvement is sought is ground clearance beneath the hopper, more particularly, beneath the tee, which is the lowest component of the assembly beneath each hopper section, and thus is subject to potential damage from contact with road hazards, particularly railroad tracks and curbs, which the hoppers cross from time to time.

Also, it is desirable at times to be able to examine the interior of the discharge valve and tee to verify cleanliness and the like. However, this can be difficult with known bolted constructions as the valve and tee are typically bolted together and to the bottom of the hopper, and the bolts can become damaged and/or corroded so as to be difficult and time consuming to remove. Clamping arrangements are also known, however, the known arrangements require a special modification of the bottom of the hopper and cannot be used with industry standard 9 ½ inch and 10 inch diameter hopper or tank flanges.

Accordingly, it would be desirable to provide a hopper tee which provides improved material flow rates, which can be combined with a discharge or dump valve to provide increased ground clearance and accessibility to the interior thereof, which provides an easy removability feature which can be merely bolted on or otherwise simply used with standard hopper flanges so as to avoid costly and complicated modification of the hopper bottom, and which otherwise overcomes the shortcomings discussed above.

SUMMARY OF THE INVENTION

According to the invention, a hopper tee which provides increased material flow rates and overcomes the shortcomings set forth above and achieves other advantages is disclosed. The hopper tee includes a first hollow pipe section having an upper end and an opposite lower end, the upper end including an inlet opening for connecting to a discharge opening of a hopper for receiving material contained in the hopper therethrough, and an interior cylindrical side wall forming an internal passage connecting the inlet opening to the lower end for flow of the material thereto. The hopper tee includes a second hollow pipe section having a first open end, an opposite second open end, an intermediate portion therebetween, and an interior cylindrical side wall forming an internal passage connecting the first and second open ends providing a flow path for a flow of air therethrough, the lower end of the first hollow pipe section being connected to the intermediate portion of the second hollow pipe section forming a material inlet port connecting the internal passage of the first hollow pipe section to the internal passage of the second hollow pipe section for flow of the material into the flow path. The hopper tee further includes an air flow director element disposed in the internal passage of the second hollow pipe section, having a surface protruding from the cylindrical side wall thereof into the flow path and oriented at an acute angle with respect to a cylinder axis of the side wall, for directing a portion of the flow of air adjacent to the material inlet port away from the port at an increased velocity, which has been found to have the effect of inducing or improving the flow of the material through the port into the flow path.

According to a preferred aspect of the invention, the surface of the air flow director element disposed in the internal passage of the second hollow pipe section is generally flat and extends at the acute angle from an upper portion of the side wall thereof downwardly toward the cylinder axis and terminates at a trailing edge located adjacent to an upstream end of the port with respect to a direction of the flow of air, for directing the flow of air away from the port, creating a pressure condition therein which induces and improves the flow of the material through the port.

According to another aspect of the invention, the hopper tee includes a valve housing integral with the upper end of the hollow pipe section, including a receptacle for receiving a valve for controlling the flow of the material into the upper end.

According to still another aspect of the invention, the hopper tee includes a clamp for removably mounting the upper end of the first hollow pipe section or the valve housing to a hopper in covering relation to the discharge opening thereof, which clamp is securable to a standard bottom flange of a hopper with minimal, if any, modification.

BRIEF DESCRIPTION OF THE DRAWINGS

Several non-limiting embodiments of the present invention will be described by way of example with reference to the accompanying drawings, in which:

FIG. 4 is an enlarged end view of the hopper tee of FIGS. 2 and 3 alone;

FIG. 5 is a sectional view taken along line 5—5 of FIG. 4, showing internal features of the hopper tee;

BEST MODE FOR CARRYING OUT THE INVENTION

Figure 1:
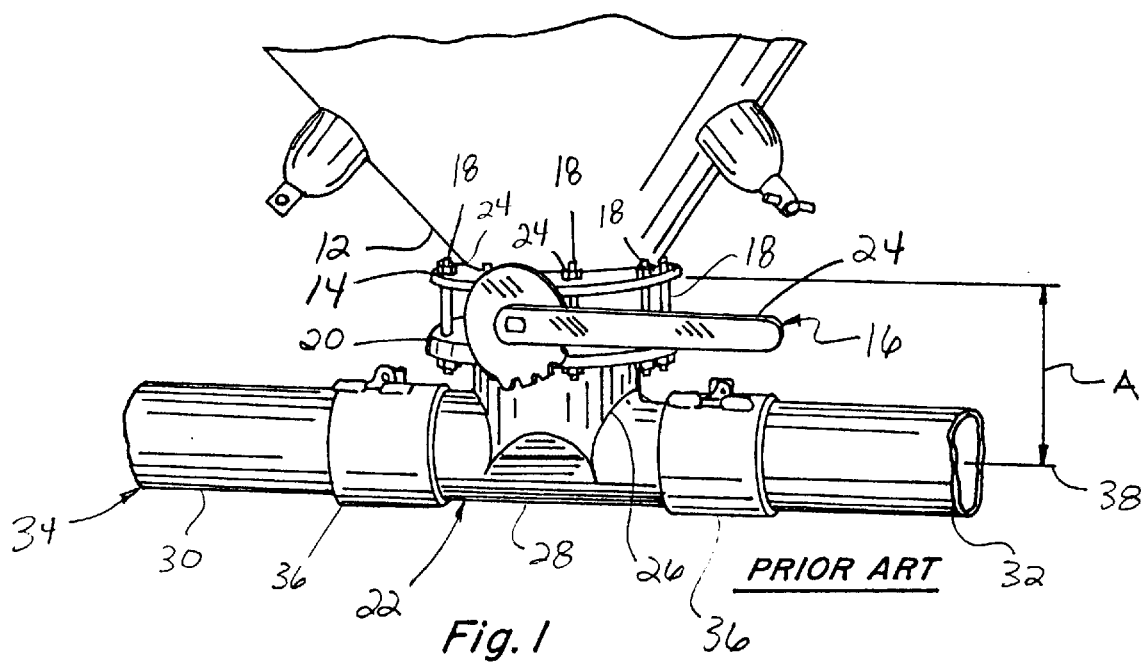
FIG. 1 is a fragmentary side elevational view of a representative hopper including a representative discharge valve and hopper tee mounted thereto in covering relation to a discharge opening thereof.

Referring now to the drawings, in FIG. 1 a representative prior art mobile hopper 10 for receiving and containing a quantity of bulk material, such as, but not limited to, powdered or granular chemical products, food products such as grain, flour, and the like, is shown. Hopper 10 has a conical bottom 12, including a conventional industry standard 9½ or 10 inch diameter bottom flange 16 extending around a bottom most discharge opening (not shown), through which the contents of hopper 10 can be discharged or dumped in the well known, conventional manner. A conventional prior art discharge or dump valve 16 is mounted to bottom flange 14 in covering relation to the discharge opening, by a plurality of studs or bolts 18 arranged in an array around valve 16 and having top ends extending through holes in bottom flange 14, and bottom ends which extend through holes in a flange 20 of a conventional prior art hopper tee 22 located beneath valve 16, studs or bolts 18 being secured in position by nuts 24 threadedly engaged therewith.

Dump valve 16 is separate from hopper tee 22 and is representative of a commonly used butterfly type valve having an internal butterfly element or member rotatable relative to a valve seat around an aperture therethrough (not shown) for controlling and preventing flow of the material therethrough, by correspondingly rotating an external valve handle 24 connected to the butterfly valve member by a shaft which extends through a housing of valve 16. Valve handle 24 is shown in a closed position, and is rotatable to move the valve member through a range of progressively more open positions in the well known conventional manner.

Hopper tee 22 includes a first hollow pipe section 26 having an open upper end including flange 20 for connecting to valve 16 for receiving the material flow therefrom, and a second hollow pipe section 28 connected to section 26 and having opposite open ends connected using conventional pipe couplers to pneumatic pipe sections 30 and 32 of a pneumatic material conveyor system 34 including a blower or fan or other source of air or gas under pressure (not shown) operable for producing a flow of air under pressure in one longitudinal direction at a time through pipe sections 28, 30, and 32, also in the well known manner, for conveying material discharged from hopper 10 to another location. Here, it should be known that hopper 10 shown can comprise but one of several hopper compartments or sections of a mobile hopper vehicle or trailer (not shown), the other hopper compartments being similarly connected to and served by system 34, by selectably opening and closing the dump valves associated respectively therewith. In this regard, the volume of the hoppers individually and collectively can be quite large, and dumping or discharging the material therefrom can be time consuming. Thus, it is desirable for productivity reasons to provide the most rapid rate of discharge of the material from the hoppers as is practical.

Hopper 10 is representative of hoppers of a wide variety of conventional mobile transport hopper vehicles and trailers which are conveyed over public roads and highways. During such conveyances, hopper 10 and the connected valve 16, hopper tee 22, and material conveying system 34 will pass from time to time over railroad tracks, bumps, rises, curbs, and other potential obstacles, which can, from time to time, come into contact with the lowermost components, namely, pipe sections 28, 30, and 32, such that resulting damage thereto can occur. Thus, it is desirable to elevate pipe sections 28, 30, and 32 as much as possible, to provide sufficient ground clearance to avoid damage, but without elevating hopper 10, which can raise the center of gravity thereof and negatively affect the stability and tipping avoidance capability of the trailer or vehicle. Thus, as one manner of increasing ground clearance, it is particularly desirable to reduce or minimize the distance between bottom flange 14 of hopper 10 and the bottoms or a horizontal centerline or axis 38 of pipes sections 28, 30, and 32, as denoted by the distance A. For the present prior art example shown, wherein first hollow pipe section 26 has an internal diameter of about 5 inches and second hollow pipe section 28 has an internal diameter of about 4 inches, which is conventional for a wide variety of hopper applications, distance A is about 6.2 inches. Even a 1 inch or somewhat less reduction in this distance would be useful and beneficial for improving ground clearance. In this regard, it is known to shorten the height of the first hollow pipe section of hopper tees. However, this can create new problems as the butterfly valve member of the dump or discharge valve when fully or almost fully open can then project into the air flow through the second pipe section, resulting in poorer and/or lower material flow rates. This can be particularly counterproductive as it is typically important to increase material flow rates for the productivity reasons discussed above. In this regard, it would be desirable to increase the diameter of pipe sections 28, 30, and 32, to achieve higher material flow rates, however, this is not practical if larger air flow generating equipment is required and if this lowers the bottom most extent of the lower pipe sections to decrease ground clearance.

Figure 2:
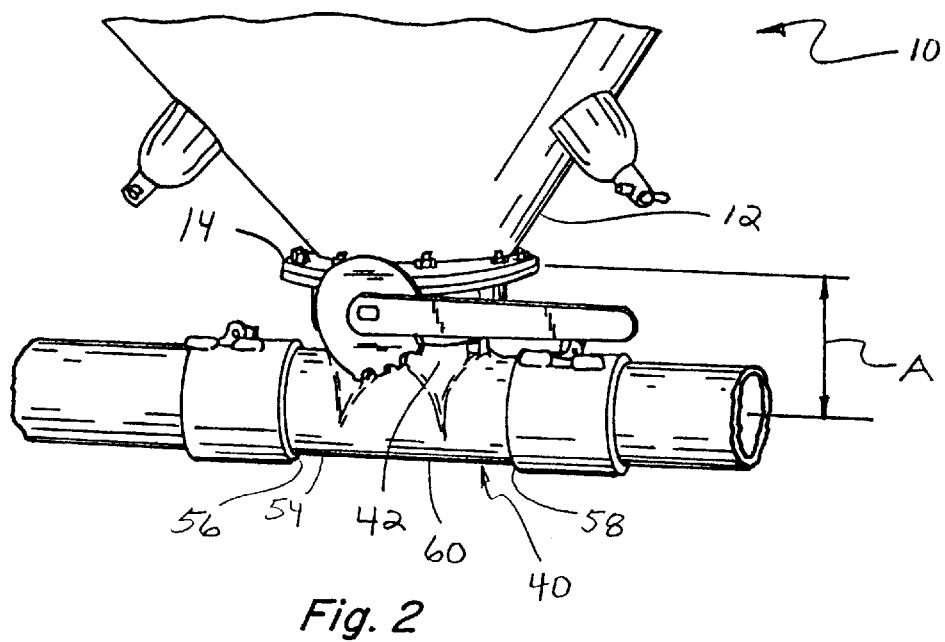
FIG. 2 is another fragmentary side elevational view of the hopper of FIG. 1, including a hopper tee according to the present invention mounted thereto in covering relation to the discharge opening thereof.
Figure 3:
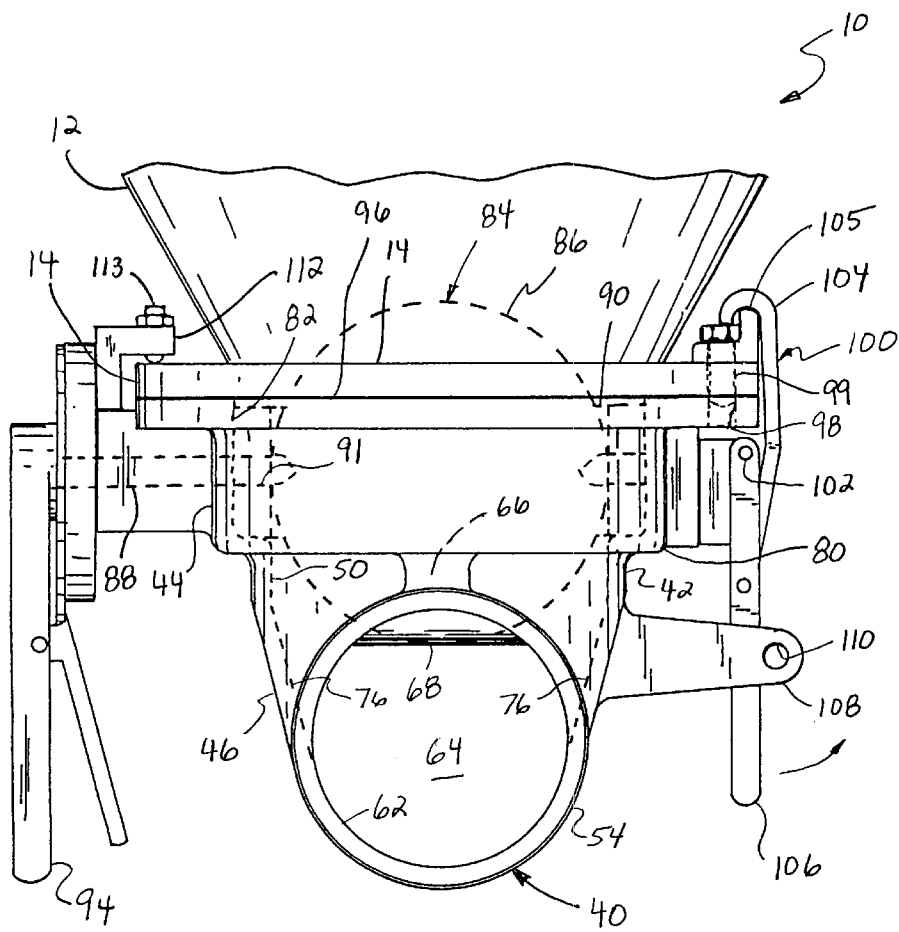
FIG. 3 is an enlarged fragmentary end view of the hopper and hopper tee of FIG. 2, showing an internal passage of a horizontal hollow pipe section thereof and a butterfly valve member thereof in an open position.

Turning to FIGS. 2 and 3, to overcome the above discussed problems, a hopper tee 40 constructed and operable according to the teachings of the present invention for providing improved and increased material flow and increased ground clearance is shown. Hopper tee 40 is shown mounted to bottom flange 14 on bottom 12 of hopper 10 in covering relation to the discharge opening thereof.

Figure 6:
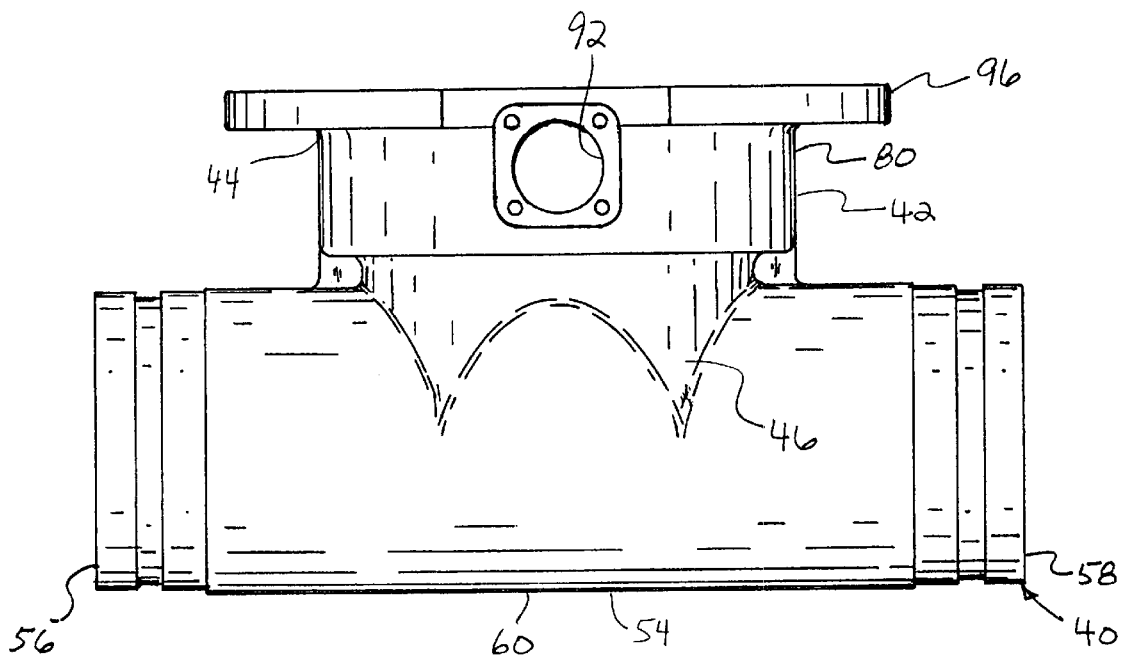
FIG. 6 is an enlarged side view of the hopper tee of FIGS. 2–5.
Figure 7:
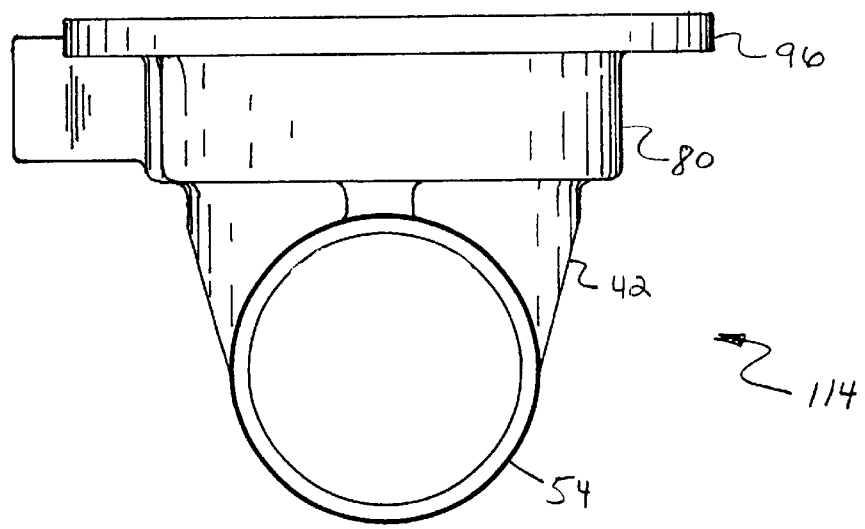
FIG. 7 is an enlarged end view of an alternative embodiment of a hopper tee according to the present invention.

Referring also to FIGS. 4, 5 and 6, hopper tee 40 includes a generally vertical or upstanding first hollow pipe section 42 having an upper end 44 and an opposite lower end 46, upper end 44 including an inlet opening 48 for connecting to a discharge opening of a hopper, such as hopper 10 shown, for receiving material contained in the hopper therethrough. Pipe section 42 includes an interior cylindrical side wall 50 forming an internal passage 52 connecting inlet opening 48 to lower end 46 for flow of the material thereto. Hopper tee 40 includes a generally horizontal second hollow pipe section 54 having a first open end 56, an opposite second open end 58, an intermediate portion 60 therebetween, and an interior cylindrical side wall 62 forming an internal passage 64 connecting first and second open ends 56, 58, defining or providing a flow path for a flow of air and the material therethrough, as denoted by arrows B. Lower end 46 of first hollow pipe section 42 is connected to intermediate portion 60 of second hollow pipe section 54 forming a material inlet port 66 connecting internal passage 52 of first hollow pipe section 42 to internal passage 64 of second hollow pipe section 54 for flow of the material into the flow path.

Referring more particularly to FIG. 5, a flow director element 68 is disposed in internal passage 64 of second hollow pipe section 54 at a location upstream from port 66 relative to the direction of the flow of air, as denoted by arrows B. Flow director 68 protrudes into internal passage 64 so as to reduce the overall cross sectional area or size thereof just upstream of port 66, which has the effect of increasing the velocity of the flow of air over or past flow director 68, denoted by arrow C. Flow director 68 includes a surface 70 protruding from cylindrical side wall 62 into the flow path, which surface 70 is oriented at an acute angle with respect to a cylinder axis 72 of side wall 62 and thus to the adjacent portion of side wall 62 itself, for directing the portion of the flow of air C away from material inlet port 66. The increased velocity, and the redirection of the flow of air C are believed to create a low pressure region or other beneficial pressure condition adjacent to or in the vicinity of port 66, and has been found to improvedly induce, siphon, or draw the material through port 66 into the flow path, as denoted by arrows D. In this regard, it has also been found that the direction of the material flowing through port 66 into internal passage 64 will generally conform about to the angle of surface 70, which is preferably from about 10 to about 18 degrees relative to the adjacent portion of side wall 62 or cylinder axis 72 for the hopper tee application shown, this having been found to best maintain the particles of the material in suspension in the air flow, it being contemplated that other acute angles, either greater or less, and other longitudinal locations and lengths for surface 70, possibly being more appropriate or better for other applications. Flow director 68 shown decreases the cross sectional area of internal passage 64 in the region shown by an amount of about 6 percent relative to the sectional area at ends 56 and 58, which amount can be increased or decreased for a particular hopper tee application, as desired. Additionally, for the present application, surface 70 shown has a generally flat shape and terminates at a straight trailing edge 74 located closely adjacent to port 66, which have been found to be the best shapes for those elements of flow director 68, it being contemplated that other shape surfaces, such as a convex or a concave surface in one or two dimensions, and/or a convex or a concave edge, may be more suitable or usable for other applications. It has been observed that the air flow over or beyond trailing edge 74 closer to port 66 is turbulent or swirling so as to appear to "tumble off" of the edge. This is believed to also possibly contribute to the improved induction of the material through port 66 into the air flow.

First hollow pipe section 42 of hopper tee 40 shown has an internal diameter of about 5 inches, and second hollow pipe section 54 has an internal diameter of about 4 inches. To provide a transition between these diameters, interior cylindrical side wall 50 of first hollow pipe section 42 has opposed lower portions 76 which are tapered inwardly at about a 15 degree angle to vertical and extend convergingly toward interior side wall 62 of second pipe section 54, terminating at about the horizontal midpoint of pipe section 54, as shown in FIGS. 3 and 4. Lower portions 76 can be flat in section as shown, or curved, and have an elliptic, parabolic, catenary, or other similar curved or angular shape upper peripheral edge 78, as shown in FIG. 5. The shape of portions 76 which is as narrow as practical at the top and the termination thereof at a relatively high location in relation to passage 64 at about the midpoint of pipe section 54, has been found to facilitate the induction of the material from port 66, as it provides a smaller overall volume transitional region at port 66 so as to maintain higher air flow velocity therethrough than other known configurations and shapes, such as that shown in the above discussed Sisk U.S. Pat. No. 4,848,396.

Hopper tee 40 additionally preferably includes an optional second flow director element 68 disposed in internal passage 64 of second hollow pipe section 54 at a location downstream from port 66 relative to the direction of the flow of air, as denoted by arrows B. Second flow director 68 similarly protrudes into internal passage 64 so as to reduce the overall cross sectional area or size thereof just downstream of port 66, which has the effect of maintaining the high velocity of the flow of air over or past second flow director 68, also denoted by arrow C, and the velocity of the material flow D, so as to desirably maintain the material mixed or suspended in the air flow C and subsequently in the downstream air flow B. Second flow director 68 also includes a surface 70 protruding from cylindrical side wall 62 into the flow path, which surface 70 is oriented at an acute angle with respect to cylinder axis 72 of side wall 62, which can be the same as the angle of surface 70 of the first flow director 68, to allow the direction of the air flow through passage 64 to be reversed, to allow hopper tee 40 to be mounted on a hopper, such as hopper 10, facing either direction such that an actuator handle 94 can be located on a desired or required side of the trailer or vehicle.

Upper end 44 of first hollow pipe section 42 of hopper tee 40 is shown including an optional integral or unitary valve housing 80 including a receptacle 82 for receiving a valve 84 for controlling the flow of the material into inlet opening 48. Referring more particularly to FIG. 3, valve 84 is preferably a conventional butterfly type valve including a disk shape butterfly member 86 supported for rotation on a shaft 88 relative to an annular valve seat 90 which mounts in receptacle 82. Shaft 88 extends radially outwardly through a hole 91 in one side of valve seat 90 and through a side opening 92 in housing 80 (FIGS. 5 and 6), and connects to a valve actuator handle 94 located externally of housing 80. Handle 94 is rotatable from a closed position (FIG. 2) to an open position (FIG. 3) for correspondingly rotating butterfly member 86 between a closed position sealingly engaged with seat 90, and a range of open positions angularly related thereto, for controlling passage or flow of material from hopper 10 to inlet opening 48. A flange 96 which is a standard 10 inch diameter pipe flange encircles the top portion of valve housing 80 and has at least one hole 98 therein at a predetermined location therearound, preferably a standard flange bolt array location, for receiving one or more locator pins 99 extending downwardly from bottom flange 14 of hopper 10, which is a standard 9 ½ or 10 inch diameter flange, for aligning flange 96 with bottom flange 14 such that hopper tee 40 is located in covering relation to the discharge outlet of hopper 10 with valve 84 positioned for controlling material flow from hopper 10 to tee 40.

Importantly, referring more particularly again to FIG. 2, by providing an integral valve housing, the representative hopper tee 40 including a first hollow pipe section 42 with an internal diameter of about 5 inches and second hollow pipe section 54 having an internal diameter of about 4 inches, which are the same as for the prior art example, will have a distance A of about 5.2 inches, or about 1 inch less than the comparably sized prior art tee and valve assembly, thus providing the desired additional ground clearance. Referring again to FIG. 3, in hopper tee 40, butterfly member 86 may extend downwardly sufficiently so as to be located partially in port 66 or even extend into internal passage 64. Flow directors 68 minimize adverse effects from this. Also, by eliminating a flange, cost and weight are saved.

Hopper tee 40 can be mounted to bottom flange using an array of bolts 18 or studs as explained above, or, referring more particularly to FIG. 3, an optional clamp 100 can be provided for removably mounting hopper tee 40 to standard 9½ or 10 inch diameter bottom flange 14 of hopper 10, to allow quick and easy removal and disconnection of hopper tee 40 for inspection, cleaning, and service. Clamp 100 is a conventional, commercially available over center clamp having a center pivot 102 mounted to a boss or block on hopper tee 40 beside valve housing 80, a clamp arm 104 which engages a cleat 105 mounted on the top surface of bottom flange 14 or at another suitable location on bottom flange 14 or elsewhere on the bottom 12 of hopper 10, and a handle 106 which pulls clamp arm 104 down in the position shown and is pivotable in the direction shown by the adjacent arrow to release arm 104 from flange 14. For safety, a boss extends outwardly from hopper tee 40 and includes a bifurcated end for receiving handle 106, which can be secured in position therein by a safety pin or clip (not shown) which can be inserted through and retained in aligned holes 110 in the bifurcated end of boss 108. One or more optional retaining clips 112 are preferably provided for holding tee 40 generally in position when clamp 100 is loosened and for helping secure and hold the opposite side of hopper tee 40 on bottom flange 14 when clamp 100 is tightened, and can include an optional jam nut assembly 113 or another suitable element which can be adjustably brought to bear against the top of flange 14 for more snugly holding it. Valve seat 90 includes a resilient seal ring or gasket (not shown) around the top surface thereof which projects upwardly from flange 96 and is compressed when flanges 14 and 96 are brought together to create a sealed condition therebetween. Jam nut assembly 113 is adjustable to compensate for manufacturing and assembly tolerances and wear, and for allowing adjusting the compression of the seal ring on that side to help provide more uniform compression therearound when clamp 100 is tightened. An important advantage of clamp 100 compared to prior known hopper tee clamps, is that it requires no modification of the bottom flange of a hopper, or only a minor "bolt on" feature, namely cleat 105, if used.

Figure 8:
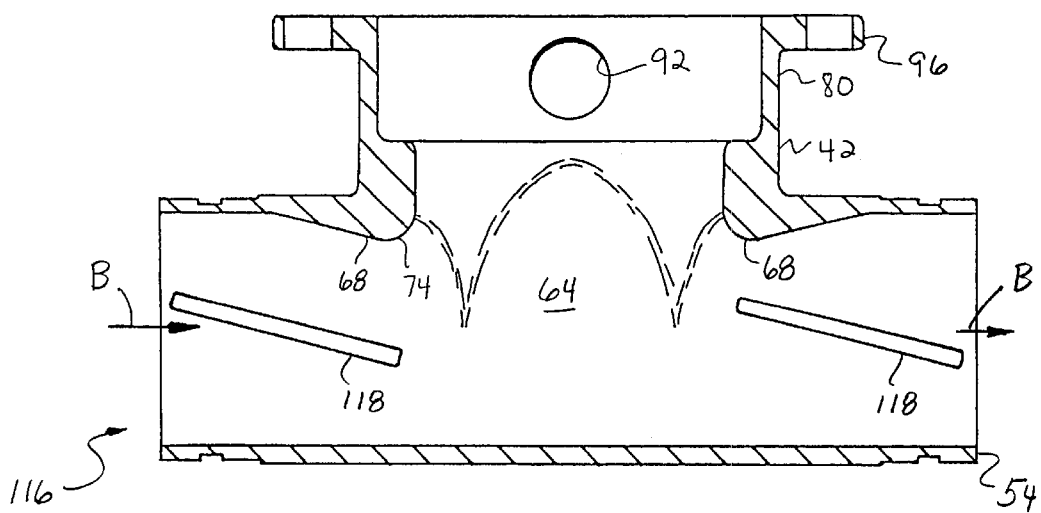
FIG. 8 is sectional view of the hopper tee of FIGS. 2–5, including optional vanes thereon.
Figure 9:
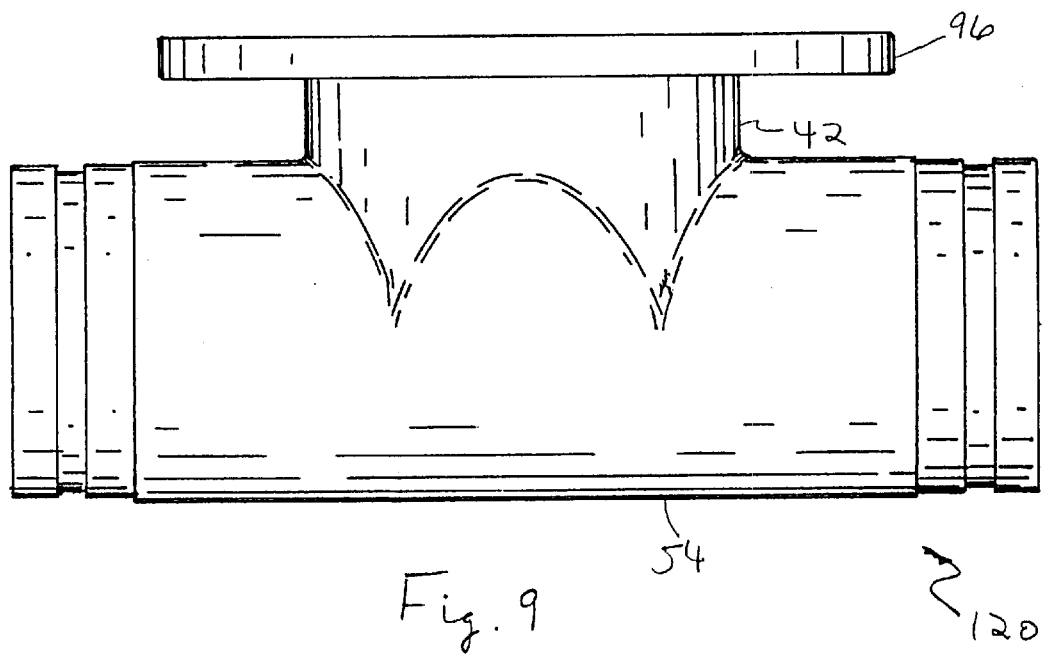
FIG. 9 is an enlarged side view of another alternative embodiment of a hopper tee according to the present invention.
Figure 10:
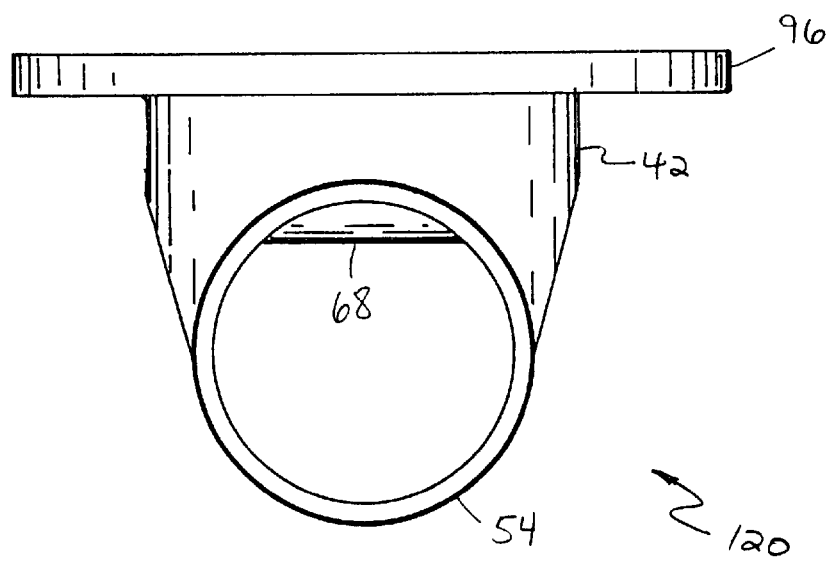
FIG. 10 is 9 is an end view of the hopper tee of FIG. 9.

Referring to FIGS. 7, 8, 9, and 10, it should be understood that the hopper tees according to the invention can be provided without various of the components and features discussed above, or with the components in various other combinations, and in combination with other features. For instance, in FIG. 7, another hopper tee 114 constructed and operable according to the present invention is shown, like parts of hopper tee 114 and hopper tee 40 being identified by like numbers. Hopper tee 114 is constructed similarly to hopper tee 40, including hollow pipe sections 42, 54, valve housing 80 for receiving valve 84, and flange 96, but not flow directors 68 or clamp 100. In FIG. 8, another hopper tee 116 constructed and operable according to the present invention is shown, like parts of hopper tee 116 and hopper tees 40 and 114 being identified by like numbers. Hopper tee 116 is constructed similarly to hopper tee 40, including hollow pipe sections 42, 54, flow directors 68, valve housing 80 and hole 92 for receiving valve 84, and flange 96, and additionally vanes 118 for swirling or twisting air flow B as it passes through passage 64, providing a beneficial rifling effect. In FIGS. 9 and 10, another hopper tee 120 constructed and operable according to the present invention is shown, like parts of hopper tee 120 and hopper tees 40, 114, and 116 being identified by like numbers. Hopper tee 120 is constructed similarly to hopper tee 40, including hollow pipe sections 42, 54, flow directors 68, and flange 96, but not valve housing 80 for receiving valve 84. Any of embodiments 114, 116, and 120 can include optional clamp 100, as desired. Additionally, it should be noted that any of the above discussed embodiments 40, 114, 116, and/or 120, can include other optional features, including, but not limited to, a conventional bottom drop or flow through opening (not shown) at the bottom of the second pipe section, having a removable cover which can be removed as desired or required to allow material flow through and access for cleaning, drainage, and other purposes.

In tests, representative hopper tee 40 was found to reduce unloading time for a test hopper by about 10 to about 20 percent, which is a substantial amount.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments, for instance having different diameter pipe sections, without departing from the scope of the invention. Accordingly, the following claims are intended to protect the invention broadly as well as in the specific form shown.

What is claimed is:

1. A hopper tee, comprising:
   a first hollow pipe section having an upper end and an opposite lower end, the upper end including an inlet opening adapted for connecting to a discharge opening at a bottom end of a hopper adapted for receiving material contained in the hopper therethrough, and an interior cylindrical side wall forming an internal passage connecting the inlet opening to the lower end for flow of the material thereto, the upper end including an integral receptacle adapted for receiving a valve operable for controlling the flow of the material into the inlet opening; and a second hollow pipe section having a first open end, an opposite second open end, an intermediate portion therebetween, and an interior cylindrical side wall forming an internal passage connecting the first and second open ends providing a flow path adapted for a flow of air therethrough, the lower end of the first hollow pipe section being connected to the intermediate portion of the second hollow pipe section forming a material inlet port for flow of the material into the internal passage of the second hollow pipe section.

2. The hopper tee of claim 1, further comprising a clamp for removably clamping the upper end thereof to a standard annular bottom flange of a hopper in covering relation to the discharge opening thereof.

3. The hopper tee of claim 1, including a butterfly type discharge valve disposed in the receptacle.

4. The hopper tee of claim 3, wherein the butterfly valve has a butterfly element which when in an open position extends partially through the port, and the second hollow pipe section includes an air flow director element which protrudes into the internal passage thereof upstream in the flow of air therethrough from the port for deflecting the flow of air away from the port and the butterfly element.

* * * * *